US012573633B2

(12) United States Patent
Han et al.

(10) Patent No.: US 12,573,633 B2
(45) Date of Patent: Mar. 10, 2026

(54) BINDER FOR ANODE OF SECONDARY BATTERY, ANODE OF SECONDARY BATTERY AND SECONDARY BATTERY

(71) Applicant: LG Chem, Ltd., Seoul (KR)

(72) Inventors: Jung Sup Han, Daejeon (KR); Seon Hee Han, Daejeon (KR); Jeong Man Son, Daejeon (KR); Min Ah Kang, Daejeon (KR); Sungjin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 701 days.

(21) Appl. No.: 17/796,058

(22) PCT Filed: Sep. 17, 2021

(86) PCT No.: PCT/KR2021/012753
§ 371 (c)(1),
(2) Date: Jul. 28, 2022

(87) PCT Pub. No.: WO2022/060148
PCT Pub. Date: Mar. 24, 2022

(65) Prior Publication Data
US 2023/0070060 A1     Mar. 9, 2023

(30) Foreign Application Priority Data

Sep. 21, 2020  (KR) ........................ 10-2020-0121574
Sep. 16, 2021  (KR) ........................ 10-2021-0123592

(51) Int. Cl.
| | |
|---|---|
| *C08F 2/22* | (2006.01) |
| *C08F 212/08* | (2006.01) |
| *C08L 13/00* | (2006.01) |
| *C09D 125/10* | (2006.01) |
| *C09D 125/14* | (2006.01) |
| *H01M 4/04* | (2006.01) |
| *H01M 4/13* | (2010.01) |
| *H01M 4/133* | (2010.01) |
| *H01M 4/134* | (2010.01) |
| *H01M 4/139* | (2010.01) |
| *H01M 4/62* | (2006.01) |
| *H01M 10/052* | (2010.01) |
| *H01M 10/0525* | (2010.01) |
| *H01M 4/02* | (2006.01) |

(52) U.S. Cl.
CPC ......... *H01M 4/622* (2013.01); *H01M 4/0404* (2013.01); *H01M 10/0525* (2013.01); *H01M 2004/027* (2013.01)

(58) Field of Classification Search
CPC .............. H01M 4/622; H01M 4/0404; H01M 10/0525; H01M 2004/027; H01M 4/133; H01M 4/134; H01M 4/139; H01M 4/13; H01M 4/62; H01M 10/052; C08F 212/08; C08F 2/22; C08L 13/00; C09D 125/10; C09D 125/14; Y02E 60/10
See application file for complete search history.

(56) References Cited

U.S. PATENT DOCUMENTS

| | | | |
|---|---|---|---|
| 6,756,153 | B1 | 6/2004 | Yamamoto et al. |
| 10,014,525 | B2 * | 7/2018 | Matsuo ................. C08F 222/30 |
| 2003/0113626 | A1 | 6/2003 | Maeda et al. |
| 2006/0286455 | A1 | 12/2006 | Kim et al. |
| 2007/0055023 | A1 | 3/2007 | Han et al. |
| 2011/0311867 | A1 | 12/2011 | Wakizaka et al. |
| 2012/0183848 | A1 | 7/2012 | Kang et al. |
| 2015/0137030 | A1 | 5/2015 | Matsuo et al. |
| 2015/0372305 | A1 * | 12/2015 | Matsuo ................. C08F 222/30 |
| | | | 252/500 |
| 2016/0204439 | A1 | 7/2016 | Sonobe |
| 2016/0260976 | A1 | 9/2016 | Matsuo et al. |
| 2018/0254515 | A1 | 9/2018 | Takahashi et al. |
| 2018/0261815 | A1 | 9/2018 | Ikemi et al. |
| 2019/0386310 | A1 | 12/2019 | Daigle et al. |
| 2020/0194792 | A1 | 6/2020 | Han et al. |
| 2020/0411872 | A1 | 12/2020 | Han et al. |
| 2021/0036326 | A1 | 2/2021 | Han et al. |
| 2021/0159504 | A1 | 5/2021 | Daigle et al. |

FOREIGN PATENT DOCUMENTS

| | | |
|---|---|---|
| CN | 1848487 A | 10/2006 |
| CN | 105229832 A | 1/2016 |
| CN | 107925088 A | 4/2018 |
| JP | 2010245035 A | 10/2010 |
| JP | 2013110108 A | 6/2013 |
| JP | 5602465 B2 * | 10/2014 |
| JP | 2015111575 A | 6/2015 |
| JP | 2019053942 A | 4/2019 |

(Continued)

OTHER PUBLICATIONS

JP-5602465-B2 Translation (Year: 2014).*
Extended European Search Report for Application No. 21869770.4 dated Dec. 6, 2023, pp. 1-5.
Search Report dated Jan. 22, 2024 from the Office Action for Chinese Application No. 202180013100.6 issued Jan. 23, 2024, 3 pages.
International Search Report for Application No. PCT/KR2021/012753 mailed Dec. 31, 2021, pp. 1-3.

*Primary Examiner* — Matthew T Martin
*Assistant Examiner* — Kevin Song
(74) *Attorney, Agent, or Firm* — Lerner David LLP

(57) ABSTRACT

This invention relates to a binder for an anode of a secondary battery, an anode of a secondary battery, and a secondary battery. Specifically, this invention provides a binder for an anode of a secondary battery that can not only improve anode adhesion, but also minimize resistance in a secondary battery, and ultimately, improve the life of a secondary battery.

14 Claims, No Drawings

(56)        References Cited

FOREIGN PATENT DOCUMENTS

| | | | |
|----|----|----|----|
| JP | WO2019017479 | A1 | 7/2020 |
| KR | 20010099909 | A | 11/2001 |
| KR | 20040104400 | A | 12/2004 |
| KR | 20070023141 | A | 2/2007 |
| KR | 2011098111 | A | 9/2011 |
| KR | 20150027058 | A | 3/2015 |
| KR | 20160077064 | A | 7/2016 |
| KR | 20180037260 | A | 4/2018 |
| KR | 20180136997 | A | 12/2018 |
| KR | 102056052 | B1 | 1/2020 |
| KR | 20200052778 | A | 5/2020 |
| KR | 20200059145 | A | 5/2020 |
| WO | 98039808 | A1 | 9/1998 |
| WO | 2015098050 | A1 | 7/2015 |

* cited by examiner

BINDER FOR ANODE OF SECONDARY BATTERY, ANODE OF SECONDARY BATTERY AND SECONDARY BATTERY

CROSS-REFERENCE TO RELATED APPLICATION(S)

The present application is a national stage entry under 35 U.S.C. § 371 of International Application No. PCT/KR2021/012753 filed on Sep. 17, 2021, which claims priority from Korean Patent Applications No. 10-2020-0121574 filed on Sep. 21, 2020, and No. 10-2021-0123592 filed on Sep. 16, 2021, all the disclosures of which are incorporated herein by reference.

TECHNICAL FIELD

This invention relates to a binder for an anode of a secondary battery, an anode of a secondary battery, and a secondary battery.

BACKGROUND OF ART

Currently, secondary batteries having high energy density and voltage are being widely applied as power supply of small electronic devices such as portable computers, mobile phones, cameras, and the like.

Recently, with the commercialization of large electronic devices (for example, electric automobiles, electric power storage apparatuses, and the like) to which high capacity secondary batteries are applied, there is an increasing demand for secondary batteries that not only have high energy density and high output characteristic, but also have low internal resistance and long life.

In order to meet such demands, various technologies for improving energy density through cathode active material, and improving output through anode active material have been suggested. However, in each electrode to which high capacity cathode active material and high output anode active material are applied, with repeated charge and discharge, bond between an anode current collector and active material; or between different active materials may become loose, and contact resistance between particles may increase, and thus, resistance of an electrode itself may also increase.

Particularly, studies for using silicone, tin, silicon-tin alloy, and the like having higher discharge capacity than natural graphite as anode active material are recently under way, but anode active material with high discharge capacity has large volume change during charge/discharge, thus deteriorating anode adhesion, increasing internal resistance of a secondary battery, and reducing the life. However, it is difficult to overcome such problems, as long as binders for an anode widely used these days (for example, PVDF) are used.

DETAILED DESCRIPTION OF THE INVENTION

Technical Problem

It is an object of the invention to provide a binder for an anode of a secondary battery that can not only improve anode adhesion, but also minimize resistance in a secondary battery, and ultimately, improve the life of a secondary battery.

Technical Solution

Specifically, according to one embodiment of the invention, there is provided a binder for an anode of a secondary battery comprising: a copolymer comprising, based on the total weight (100 wt %) of repeat units, a) 40 to 55 wt % of first repeat units derived from aliphatic conjugated diene-based first monomers, b) 40 to 55 wt % of second repeat units derived from aromatic vinyl-based second monomers, c) 0.1 to 3 wt % of third repeat units derived from unsaturated carboxylic acid-based third monomers, and d) 1 to 11 wt % of fourth repeat units derived from polyethylene glycol mono(meth)acrylate.

According to other embodiments of the invention, there are provided a method for preparing the binder for an anode of one embodiment, an anode mixture for a secondary battery comprising the binder for an anode of one embodiment and anode active material, an anode of a secondary battery comprising the binder for an anode of one embodiment in an anode mixture layer, and a lithium secondary battery.

Advantageous Effects

The binder for an anode of a secondary battery according to one embodiment can improve anode adhesion, and simultaneously, minimize resistance in a secondary battery, and ultimately, improve the life of a secondary battery.

DETAILED DESCRIPTION OF THE EMBODIMENTS

As used herein, terms "a first", "a second" and the like are used to explain various constructional elements, and they are used only to distinguish one constructional element from other constructional elements.

And, the terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

And, in case it is stated that each layer or element is formed "on" or "above" each layer or element, it means that each layer or element is formed right above each layer or element, or that other layers or elements may be additionally formed between the layers or on the object or substrate.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

I. Binder for an Anode of a Secondary Battery

According to one embodiment of the invention, there is provided a binder for an anode of a secondary battery comprising: a copolymer comprising, based on the total weight (100 wt %) of repeat units, a) 40 to 55 wt % of first repeat units derived from aliphatic conjugated diene-based first monomers, b) 40 to 55 wt % of second repeat units derived from aromatic vinyl-based second monomers, c) 0.1 to 3 wt % of third repeat units derived from unsaturated carboxylic acid-based third monomers, and d) 1 to 11 wt % of fourth repeat units derived from polyethylene glycol mono(meth)acrylate.

The binder for an anode of one embodiment comprises a copolymer wherein the kinds and contents of repeat units are respectively controlled to specific ranges. Such a copolymer may increase anode adhesion, and improve the life of a secondary battery. At the same time, it can lower resistance in a secondary battery, and improve output of a secondary battery.

Particularly, the d) fourth repeat units derived from polyethylene glycol mono(meth)acrylate exhibit the effect of improving flexibility by the long ethylene oxide groups in the structure, and can increase affinity with a current collector by the hydroxy groups, and can increase adhesion between an anode current collector and active material; or between different active materials; and minimize capacity reduction of a secondary battery (namely, improve life characteristic).

And, the fourth repeat units exhibit the effect of increasing affinity with electrolyte by the ethylene oxide groups in the structure, thus increasing ionic conductivity, and can facilitate metal ion (for example, lithium ion) transfer, lower internal resistance of a secondary battery, and improve the output characteristics.

However, the effects of the fourth repeat units may be exhibited only when the content of the fourth repeat units is 1 to 11 wt %, based on the total weight (100 wt %) of the repeat units.

The reason is that when the content of the fourth repeat units is less than 1 wt %, the effect may be insignificant, and when the content is greater than 11 wt %, strength of a binder may be deteriorated to the contrary, and thus, adhesion may be lowered and life may decrease.

Meanwhile, even if the content of the fourth repeat units meets 1 to 11 wt %, in case any one of the first to third repeat units are replaced with other materials, or the limited content ranges of one embodiment are not fulfilled (including the absence), anode adhesion may be deteriorated or capacity retention rate may be deteriorated.

The first repeat units perform functions for inhibiting electrolyte swelling at high temperature and improving adhesion between anode active material and a current collector, and the second repeat units and the third repeat units perform functions for increasing the strength of a binder and affinity with electrolyte.

When all the repeat units meet the limited content ranges of one embodiment, the functions of the repeat units may be in balance, thus improving anode adhesion, and simultaneously, minimizing resistance in a secondary battery, and ultimately, improving the life of a secondary battery.

Particularly, the binder for an anode of a secondary battery according to one embodiment may exhibit excellent effect in an anode mixture for a secondary battery comprising a silicon compound as anode active material. For example, if a silicon compound is applied as anode active material, an anode mixture for a secondary battery comprising the same may exhibit hydrogen ion concentration of pH 11, and thus, when a binder is introduced, stability may be deteriorated, viscosity may increase, and agglomerate may be generated. The binder for an anode of a secondary battery according to one embodiment comprises long hydrophilic functional groups derived from polyethylene glycol mono (meth)acrylate, and thus, enables exhibition of excellent stability in an anode mixture for a secondary battery having high pH wherein a silicon compound is applied as anode active material.

Hereinafter, the binder for an anode of one embodiment will be explained in detail according to repeat units.

Weight Ratio of Repeat Units

The binder for an anode of one embodiment meets the kinds and contents of repeat units as explained above, and the weight ratio of the first repeat units/fourth repeat units may be 3.64 to 55, the weight ratio of the second repeat units/fourth repeat units may be 3.64 to 55, the weight ratio of the third repeat units/fourth repeat units may be 0.01 to 3, and the weight ratio of the first repeat units/second repeat units may be 0.73 to 1.38.

When such ranges are all fulfilled, synergistic effects by the repeat units may be improved.

For example, the weight ratio of the first repeat units/ fourth repeat units may be 4.4 to 48.5, the weight ratio of the second repeat units/fourth repeat units may be 4.4 to 48.5, the weight ratio of the third repeat units/fourth repeat units may be 0.2 to 2, and the weight ratio of the first repeat units/second repeat units may be 1.

First Repeat Units

The first repeat units are derived from aliphatic conjugated diene-based first monomers. Specifically, the first repeat units correspond to a structural unit of a copolymer formed by introducing aliphatic conjugated diene-based first monomers during polymerization.

In case such first repeat units are included in a copolymer, electrolyte swelling at high temperature may be inhibited, and the binder for an anode may have elasticity due to the rubber component, thus reducing the thickness of an anode and decreasing gas generation, and yet, improving adhesion so as to maintain binding capacity between anode active material and a current collector.

As the aliphatic conjugated diene-based first monomers, aliphatic conjugated diene-based compounds having a carbon number of 2 to 20 may be used. As non-limiting examples, the aliphatic conjugated diene-based first monomers may be one or more selected from the group consisting of 1,3-butadiene, 2-methyl-1,3-butadiene, 2,3-dimethyl-1,3-butadiene, 1,2-dimethyl-1,3-butadiene, 1,4-dimethyl-1,3-butadiene, 1-ethyl-1,3-butadiene, 2-phenyl-1,3-butadiene, 1,3-pentadiene, 1,4-pentadiene, 3-methyl-1,3-pentadiene, 4-methyl-1,3-pentadiene, 2,4-dimethyl-1,3-pentadiene, 3-ethyl-1,3-pentadiene, 1,3-hexadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene and 7-methyl-1,6-octadiene. For example, as the aliphatic conjugated diene-based first monomers, 1,3-butadiene may be used.

The first repeat units may be included in the content of 40 to 55 wt %, based on the total weight (100 wt %) of the repeat units. Namely, when preparing the copolymer, the first monomers may be used in the content of 40 to 55 wt %, based on the total weight (100 wt %) of the monomers.

For example, the first repeat units may be included in the content of 40 wt % or more, 40.3 wt % or more, 40.6 wt % or more, or 41 wt % or more, and 55 wt % or less, 54.7 wt % or less, 54.4 wt % or less, or 54 wt % or less, based on the total weight (100 wt %) of the repeat units.

If the content of the first repeat units increases within the above range, the above explained effects of the first repeat units may be improved. However, if the content of the first repeat units exceeds 55 wt %, yield of a binder may decrease to the contrary, or strength of the obtained binder may be deteriorated.

Second Repeat Units

The second repeat units are derived from aromatic vinyl-based second monomers. Specifically, the second repeat units correspond to a structural unit of a copolymer formed by introducing the above explained second monomers during polymerization.

In case such second repeat units are included in a copolymer, strength and affinity with electrolyte of the binder for an anode of one embodiment may be improved.

The aromatic vinyl-based second monomers may be one or more selected from the group consisting of styrene, α-methylstyrene, β-methylstyrene, p-t-butylstyrene, chlorostyrene, vinyl benzoate, methyl vinyl benzoate, vinyl naphthalene, chloromethylstyrene, hydroxymethylstyrene and divinyl benzene.

The second repeat units may be included in the content of 40 to 55 wt %, based on the total weight (100 wt %) of the repeat units. Namely, the second monomers may be used in the content of 40 to 55 wt %, based on the total weight (100 wt %) of the monomers when preparing the copolymer.

For example, the second repeat units may be included in the content of 40 wt % or more, 40.3 wt % or more, 40.6 wt % or more, or 41 wt % or more, and 55 wt % or less, 54.7 wt % or less, 54.4 wt % or less, or 54 wt % or less, based on the total weight (100 wt %) of the repeat units.

If the content of the second repeat units increases within the above range, the above explained effects of the second repeat units may be improved. However, if the content of the second repeat units exceeds 55 wt %, flowability of a binder may be deteriorated or adhesion may decrease.

Third Repeat Units

The third repeat units are derived from unsaturated carboxylic acid-based third monomers. Specifically, the third repeat units correspond to a structural unit of a copolymer formed by introducing the above explained third monomers.

In case such third repeat units are included in the copolymer, strength and storage stability of the binder for an anode of one embodiment may be improved.

The unsaturated carboxylic acid-based third monomers may be one or more selected from the group consisting of acrylic acid, methacrylic acid, maleic acid, fumaric acid, glutaric acid, itaconic acid, tetrahydrophthalic acid, crotonic acid, isocrotonic acid, and nadic acid. For example, the third monomers may be acrylic acid.

The third repeat units may be included in the content of 0.1 to 3 wt %, based on the total weight (wt %) of the repeat units. Namely, the third monomers may be used in the amount of 0.1 to 3 wt %, based on the total weight (100 wt %) of the monomers, when reparing the copolymer.

For example, the third repeat units may be included in the content of 0.1 wt % or more, 0.5 wt % or more, 1 wt % or more, or 1.5 wt % or more, and 3 wt % or less, 2.8 wt % or less, 2.5 wt % or less, or 2.3 wt % or less, based on the total weight (100 wt %) of the repeat units.

If the content of the third repeat units increases within the above range, the above explained effects of the third repeat units may be improved. However, if the content of the third repeat units exceeds 3 wt %, flowability of a binder may be deteriorated or affinity with electrolyte may be lowered.

Fourth Repeat Units

The fourth repeat units are derived from polyethylene glycol mono(meth)acrylate-based fourth monomers. Specifically, the fourth repeat units correspond to a structural unit of a copolymer formed by introducing the above explained forth monomers during polymerization.

In case such fourth repeat units are included in a copolymer, adhesion between an anode current collector and active material; or between different active materials may be increased, and yet, metal ion (for example, lithium ion) transfer may be facilitated. Thus, capacity reduction of a lithium secondary battery may be minimized (namely, life characteristics may be improved), internal resistance may be lowered, and output characteristics may be improved.

The polyethylene glycol mono(meth)acrylate-based fourth monomers may be a polyethylene glycol monoacrylate, polyethylene glycol monomethacrylate, or a mixture thereof.

The fourth repeat units may be included in the content of 1 to 11 wt %, based on the total weight(100 wt %) of the repeat units. Namely, the fourth monomers may be used in the content of 1 to 11 wt %, based on the total weight(100 wt %) of the monomers, when preparing the copolymer.

For example, the fourth repeat units may be included in the content of 1 wt % or more, and 11 wt % or less, 10.6 wt % or less, 10.3 wt % or less, or 10 wt % or less, based on the total weight(100 wt %) of the repeat units.

If the content of the fourth repeat units increases within the above range, the above explained effects of the fourth repeat units may be improved. However, if the content of the fourth repeat units exceeds 11 wt %, adhesion of a binder may be deteriorated or battery life may decrease.

Average Particle Diameter of Polymer (Latex Particles)

Meanwhile, in the binder for an anode of one embodiment, the copolymer may be in the form of latex particles prepared through emulsion polymerization.

Specifically, the copolymer may be latex particles having an average particle diameter of 50 to 500 nm.

The average particle diameter of the latex particles may be measured using particle size analyzer (NICOMP AW 380, manufactured by PSS Inc.) using dynamic light scattering.

Specifically, throughout the specification, the 'average particle diameter' means arithmetic mean particle diameter in the particle size distribution measured by dynamic light scattering, wherein the arithmetic mean particle diameter may be measured as intensity distribution mean diameter, volume distribution mean diameter, or number distribution mean diameter, and among them, intensity distribution mean diameter is preferably measured.

For example, the copolymer may be latex particles having an average particle diameter of 50 nm or more, or 70 nm or more, or 100 nm or more, and 500 nm or less, or 400 nm or less, or 300 nm or less, or 200 nm or less. If the average particle diameter of the latex particles is too small, viscosity may increase, and adhesion to a current collector of a mixture layer comprising the same may be weakened, and if the average particle diameter of the latex particles is too large, stability of particles may be deteriorated.

Gel Content in a Binder

Meanwhile, the binder for an anode of one embodiment may have a gel content calculated by the following Mathematical Formula 1, of 95% or more:

$$\text{Gel content}(\%) = M_b/M_a * 100 \qquad \text{[Mathematical Formula 1]}$$

in the Mathematical Formula 1, $M_a$ is the weight of a binder for an anode dried at 80° C. for 24 hours, and $M_b$ is the weight of a copolymer remaining on mesh, after dipping the binder for an anode of which weight has been measured in 50 g of tetrahydrofuran(THF) for 24 hours or more, filtering it through 200 mesh, and then, drying the mesh and the binder for an anode remaining on the mesh at 80° C. for 24 hours, The gel content means the degree of crosslinking of a copolymer, and is represented by a fraction insoluble in electrolyte, by calculating according to the Mathematical Formula 1. Preferably, the gel content of the binder for an anode of one embodiment is 95% to 99%, or 95% to 98%, or 96% to 97.5%, and if the gel content is less than 95%, electrolyte swelling may increase, and thus, life of a battery may be deteriorated.

Stability of a Binder (Peel Strength)

And, the binder for an anode of one embodiment may have coagulum of 200 ppm or less, or 150 ppm or less, or 130 ppm or less, said coagulum being measured by introducing 100 g of the binder in a container, applying shear at 3000 rpm for 10 minutes, and then, filtering it through 200 mesh, and simultaneously, have 180 degree peel strength between an anode mixture prepared using the binder for an anode of one embodiment and a current collector, of 25 g/in or more, or 28 g/in or more, or 30 g/in or more, and 50 g/in or less, or 48 g/in or less, or 45 g/in or less.

Aqueous Solvent

And, to the binder for an anode of one embodiment, besides the above explained copolymer, i.e., latex particles, an aqueous solvent, i.e., water may be added.

The aqueous solvent may be used in the content of about 50 to about 1,000 parts by weight, specifically about 100 to about 400 parts by weight, based on 100 parts by weight of the copolymer, in terms of stability of latex particles and viscosity control. For example, it may be used such that the total solid content (TSC) may be adjusted to about 10 to about 65%, based on the total weight (100 wt %) of the binder for an anode of one embodiment.

If the content of the aqueous solvent is too small, stability of latex particles may be deteriorated, and if the content of the solvent is too large, viscosity may decrease, and thus, adhesive force of a binder may become weak., and thus, the performances of a battery may be deteriorated.

II. A Method for Preparing a Binder for an Anode of a Secondary Battery

According to another embodiment of the invention, there is provided a method for preparing a binder for an anode of a secondary battery, comprising a step of conducting emulsion polymerization of a monomer mixture in the presence of an emulsifier and a polymerization initiator to prepare a copolymer.

Based on the total weight(100 wt %) of the monomer mixture, a) 40 to 55 wt % of aliphatic conjugated diene-based first monomers, b) 40 to 55 wt % of aromatic vinyl-based second monomers, c) 0.1 to 3 wt % of unsaturated carboxylic acid-based third monomers, and d) 1 to 11 wt % of polyethylene glycol mono(meth)acrylate monomers are included.

The method for preparing binder for an anode of one embodiment may be a method for preparing the above explained binder for an anode of one embodiment.

In this regard, redundant explanations will be omitted.

Emulsion Polymerization

And, the emulsion polymerization may be conducted by single stage polymerization or multi stage polymerization. Wherein, the single stage polymerization means a method of introducing monomers in a single reactor and polymerizing them at the same time, and the multi stage polymerization means a method of sequentially polymerizing monomers used at two or more stages.

And, the emulsion polymerization may be conducted in a solution comprising the above explained aqueous solvent, in the presence of an emulsifier and a polymerization initiator.

The polymerization temperature and time of the emulsion polymerization for the preparation of copolymer may be appropriately determined according to circumstances. For example, the polymerization temperature may be about 50° C. to about 200° C., and polymerization time may be about 0.5 hours to about 20 hours.

Polymerization Initiator

As the polymerization initiator that can be used for emulsion polymerization, inorganic or organic peroxides may be used, and for example, water-soluble initiators including potassium persulfate, sodium persulfate, ammonium persulfate, and the like, and oil-soluble initiator including cumene hydroperoxide, benzoyl peroxide, and the like, may be used.

Activator

And, in addition to the polymerization initiator, an activator may be further included so as to promote the initiation of a reaction, and as the activator, one or more selected from the group consisting of sodium formaldehyde sulfoxylate, sodium ethylene diamine tetraacetate, ferrous sulfate, and dextrose may be used.

Emulsifier

And, as the emulsifier for the emulsion polymerization, anionic emulsifiers, such as sodium dodecyl diphenyl ether disulfonate, sodium lauryl sulfate, sodium dodecyl benzene sulfonate, dioctyl sodium sulfosuccinate, and the like; or non-ionic emulsifiers, such as polyethylene oxide alkyl ether such as polyoxyethylene lauryl ether, polyethylene oxide alkyl aryl ether, polyethylene oxide alkyl amine, polyethylene oxide alkyl ester, and the like, may be used. Such emulsifiers simultaneously have hydrophilic group and hydrophobic group, and during the emulsion polymerization process, form a micelle structure and enable polymerization of monomers in the micelle structure. Preferably, the anionic emulsifier and the non-ionic emulsifier may be used alone or in combination of two or more kinds, and use of anionic emulsifier and non-ionic emulsifier in combination may be more effective, but the invention is not necessarily limited to such a kind of emulsifiers.

And, the emulsifier may be used, for example, in the content of, about 0.01 to about 10 parts by weight, about 1 to about 10 parts by weight, or about 3 to about 5 parts by weight, based on 100 parts by weight of the total monomers used for the preparation of a copolymer.

III. Anode Mixture and Anode

According to still another embodiments of the invention, there are provided: an anode mixture for a secondary battery comprising the above explained binder for an anode of a secondary battery of one embodiment, and anode active material; and an anode of a secondary battery comprising an anode mixture layer comprising the anode mixture for a secondary battery, and an anode current collector.

Except the binder for an anode of one embodiment, the anode active material, anode current collector, and the like, used for an anode mixture and an anode may respectively comprise commonly known constructional elements.

Anode

The binder for an anode of one embodiment may be included in the content of 1 wt % to 10 wt %, specifically 1 wt % to 5 wt %, based on the total weight (100 wt %) of the anode mixture. When the content is fulfilled, the content of the anode active material may be relatively increased, and discharge capacify of an anode may be further improved.

Meanwhile, since the binder for an anode of one embodiment has excellent characteristics in terms of binding force, mechanical properties, and the like, not only when graphite-based anode active material is used as the anode active material of the mixture, but also when anode active material with higher capacity is used, binding forces between anode active material and anode active material, between anode active material and an anode current collector, and the like may be maintained, and expansion of anode active material may be inhibited by the mechanical properties.

Since the binder for an anode of one embodiment is suitable for application in combination with graphite-based anode active material, and anode active materials with higher capacity, the kind of the anode active materials is not specifically limited in one embodiment of the invention.

Specifically, as the anode active material, carbons such as non-graphitizable carbon, graphite-based carbon, and the like; metal mixed oxides such as $Li_xFe_2O_3(0\leq x\leq 1)$, $Li_xWO_2$ $(0\leq x\leq 1)$, $Sn_xMe_{1-x}Me'_yO_z$ (Me: Mn, Fe, Pb, Ge; Me': Al, B, P, Si, elements of Group 1, Group 2, Group 3 of periodic table, halogen; $0\leq x\leq 1$; $1\leq y\leq 3$; $1\leq z\leq 8$); lithium metal; lithium alloy; silicon-based alloy; tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, and the like; conductive polymer such as polyacetylene, and the like; Li—Co—Ni-based material; titanium oxide; lithium titanium oxide, and the like may be used.

According to one embodiment, the anode active material may comprise materials capable of reversibly intercalating and deintercalating lithium ions, lithium metal, alloys of lithium metal, materials that can be doped and dedoped with lithium, and transition metal oxide.

As the materials capable of reversibly intercalating and deintercalating lithium ions, carbonaceous materials such as crystalline carbon, amorphous carbon or a mixture thereof may be exemplified. Specifically, the carbonaceous material may be natural graphite, artificial graphite, Kish graphite, pyrolytic carbon, mesophase pitches, mesophase pitch based carbon fiber, meso-carbon microbeads, petroleum or coal tar pitch derived cokes, soft carbon, hard carbon, and the like.

The alloys of lithium metal may be alloys of lithium and metal selected from the group consisting of Na, K, Rb, Cs, Fr, Be, Mg, Ca, Sr, Si, Sb, Pb, In, Zn, Ba, Ra, Ge, Al, Sn, Bi, Ga, and Cd.

The material that can be doped and dedoped with lithium may be Si, Si—C complex, SiOx $(0<x<2)$, Si-Q alloy (wherein Q is an element selected from the group consisting of alkali metal, alkali earth metal, Group 13 element, Group 14 element, Group 15 element, transition metal, rare earth element, and combinations thereof; provided that Q is not Si), Sn, $SnO_2$, Sn—R alloy (wherein R is an element selected from the group consisting of alkali metal, alkali earth metal, Group 13 element, Group 14 element, Group 15 element, transition metal, rare earth element, and combinations thereof; provided that R is not Sn), and the like. And, as the material that can be doped and dedoped with lithium, at least one of the above examples and $SiO_2$ may be used in combination. The Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and the like.

And, the transition metal oxide may be vanadium oxide, lithium vanadium oxide, lithium titanium oxide, and the like.

Preferably, the anode may comprise one or more anode active materials selected from the group consisting of carbonaceous material and silicon compound. Wherein, the carbonaceous material may be one or more selected from the group consisting of natural graphite, artificial graphite, Kish graphite, pyrolytic carbon, mesophase pitches, mesophase pitch based carbon fiber, meso-carbon microbeads, petroleum or coal tar pitch derived cokes, soft carbon, hard carbon, and the like, as exemplified above. And, the silicon compound may be a compound including Si as exemplified above, namely, Si, Si—C complex, SiOx$(0<x<2)$, Si-Q alloy, a mixture thereof, or a mixture of at least one of them and $SiO_2$.

The anode current collector is generally made with a thickness of 3 μm to 500 μm. Such an anode current collector is not specifically limited as long as it has conductivity without inducing chemical change in a battery, and for example, copper, stainless steel, aluminum, nickel, titanium, fired carbon, copper or stainless steel surface treated with carbon, nickel, titanium, silver, and the like, aluminum-cadmium alloy, and the like may be used. And, fine uneven-ness may be formed on the surface to reinforce the binding strength of the anode active material, and it may be used in various forms such as a film, a sheet, a foil, a net, a porous body, a foaming body, non-woven fabrics, and the like.

The anode may be prepared by coating an anode mixture comprising anode active material and the binder on an anode current collector, and then, drying and rolling, and if nec-essary, a conductive agent, filler, and the like may be further added.

The conductive agent is not specifically limited as long as it has conductivity without inducing chemical change in the constituted battery, and for example, conductive materials comprising graphite such as natural graphite or artificial graphite, and the like; carbon-based material such as carbon black, acetylene black, ketjen black, carbon fiber, and the like; metal-based material such as metal powder such as copper, nickel, aluminum, silver or metal fiber, and the like; conductive polymer such as polyphenylene derivatives; or a mixture thereof may be used.

The filler is optionally used as a component for inhibiting the expansion of an anode, is not specifically limited as long as it is fibrous material without inducing chemical changes in the constituted battery, and for example, olefin polymer such as polyethylene, polypropylene; fibrous material such as glass fiber, carbon fiber, and the like may be used.

Cathode

The cathode comprises cathode active material, and as the cathode active material, layered compounds such as lithium cobalt oxide ($LiCoO_2$), lithium nickel oxide ($LiNiO_2$), unsubstituted or substituted with one or more transition metals; lithium manganese oxide such as $Li_{1+x}Mn_{2-x}O_4$ (wherein, x is 0 to 0.33), $LiMnO_3$, $LiMn_2O_3$, $LiMnO_2$, and the like; lithium copper oxide ($Li_2CuO_2$); vanadium oxide such as $LiV_3O_8$, $LiFe_3O_4$, $V_2O_5$, $Cu_2V_2O_7$, and the like; Ni-site lithium nickel oxide represented by the Chemical Formula $LiNi_{1-x}M_xO_2$ (wherein, M=Co, Mn, Al, Cu, Fe, Mg, B or Ga, x=0.01 to 0.3); lithium manganese mixed oxide represented by the Chemical Formula $LiMn_{2-x}M_xO_2$ (wherein, M=Co, Ni, Fe, Cr, Zn or Ta, and x=0.01 to 0.1) or $Li_2Mn_3MO_8$ (wherein, M=Fe, Co, Ni, Cu or Zn); lithium manganese mixed oxide of a spinel structure represented by $LiNi_xMn_{2-x}O_4$; $LiMn_2O_4$ in which a part of Li is substituted with alkali earth metal ion; disulfide compounds; $Fe_2(MoO_4)_3$, and the like may be mentioned, but the cathode active material is not limited thereto.

The cathode current collector is generally formed to a thickness of 3 μm to 500 μm. Such a cathode current collector is not specifically limited as long as it has high conductivity without inducing chemical change in corre-sponding battery, and for example, stainless steel, alumi-num, nickel, titanium, baked carbon, or aluminum or stain-less steel of which surface is treated with carbon, nickel, titanium, silver, and the like, may be used. On the surface of the cathode current collector, fine unevenness may be formed to increase adhesion with cathode active material, and it may be used in various shapes such as a film, a sheet, a foil, a net, a porous body, a foam body, a non-woven body, and the like.

The conductive agent is not specifically limited as long as it has conductivity without inducing chemical change in the constituted battery, and for example, graphite such as natural graphite or artificial graphite, and the like; carbon black such as carbon black, acetylene black, ketjen black, channel black, furnace black, lamp black, thermal black, and the like; conductive fiber such as carbon fiber or metal fiber, and the like; metal powder such as fluorinated carbon, aluminum, nickel powder, and the like; conductive whisker such as zinc oxide, potassium titanate, and the like; conductive metal oxide such as titanium oxide, and the like; polyphenylene derivatives, and the like may be used.

Among the anode and cathode, in the electrode where the above explained binder is not used, commonly known binders may be used. As representative examples, polyvinylalcohol, carboxylmethyl cellulose, hydroxypropyl cellulose, polyvinyl chloride, carboxylated polyvinyl chloride, polyvinyl fluoride, polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used, but the binder is not limited thereto.

The anode and cathode may be respectively prepared by mixing each active material and binder, and if necessary, a conductive agent, filler, and the like in a solvent to prepare an electrode mixture, and coating the electrode mixture on each electrode current collector. Since such an electrode preparation method is well known in the art, detailed explanation thereof will be omitted.

IV. Secondary Battery

According to still another embodiment of the invention, there is provided a secondary battery comprising the above explained anode of a secondary battery of one embodiment. Such a battery may specifically comprise a cathode; electrolyte; and an anode.

The secondary battery may be realized as a lithium secondary battery.

The lithium secondary battery may be prepared by impregnating an electrode assembly comprising a cathode, a separator and an anode with non-aqueous electrolyte.

The cathode and anode are as explained above.

The separator separates an anode and a cathode and provides a pathway for lithium ion movement, and those commonly used in lithium batteries may be used. Namely, those having low resistance to electrolyte ion movement and having excellent electrolyte wetting capability may be used. For example, it may be selected from glass fiber, polyester, Teflon, polyethylene, polypropylene, polytetrafluoroethylene (PTFE) or combinations thereof, and it may be in the form of non-woven fabrics or woven fabrics. For example, polyolefin polymer separators such as polyethylene, polypropylene, and the like are mainly used for lithium ion batteries, and coated separators including ceramic components or polymer material may be used to secure heat resistance or mechanical strength, and it may be selectively used in a monolayer or multilayer structure.

According to circumstances, gel polymer electrolyte may be coated on the separator so as to increase battery stability. As representative examples of the gel polymer, polyethylene oxide, polyvinylidene fluoride, polyacrylonitrile, and the like may be mentioned.

However, in case solid electrolyte is used instead of the non-aqueous electrolyte, the solid electrolyte may also serve as a separator.

The non-aqueous electrolyte may be liquid electrolyte comprising a non-aqueous organic solvent and lithium salts. The non-aqueous organic solvent functions as a medium where ions involved in the electrochemical reactions of batteries can move.

As the non-aqueous electrolyte, non-aqueous liquid electrolyte, organic solid electrolyte, inorganic solid electrolyte, and the like may be used.

As the non-aqueous liquid electrolyte, aprotic organic solvents such as N-methyl-2-pyrrolidinone, propylene carbonate, ethylene carbonate, butylenes carbonate, dimethyl carbonate, diethyl carbonate, ethylmethyl carbonate, gamma-butyrolactone, 1,2-dimethoxy ethane, 1,2-diethoxy ethane, tetrahydrofurane, 2-methyl tetrahydrofurane, dimethylsulfoxide, 1,3-dioxolane, 4-methyl-1,3-dioxene, diethylether, formamide, dimethylformamide, dioxolane, acetonitrile, nitromethane, formic acid methyl, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofurane derivatives, ether, methyl propionate, ethyl propionate, and the like may be used.

As the organic solid electrolyte, polyethylene derivatives, polyethylene oxide derivatives, polypropylene oxide derivatives, phosphoric acid ester polymer, poly lysine, polyester sulfide, polyvinyl alcohol, polyvinylidine fluoride, polymer containing ionic dissociable groups, and the like may be used.

As the inorganic solid electrolyte, nitride, halogenide, sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and the like may be used.

The lithium salt is material soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroboroane lithium, lower aliphatic carbonic acid lithium, 4 phenyl lithium borate, and the like may be used.

And, in order to improve charge/discharge property, flame retardancy, and the like, pyridine, triethyl phosphate, triethanolamine, cyclic ether, ethylene diamine, n-glyme, hexaphosphoric acid triamide, nitrobenzene derivatives, sulfur, quinone imine dye, N-substituted oxazolidinone, N,N-substituted imidazolidine, ethyleneglycol dialkylether, ammonium salt, pyrrole, 2-methoxy ethanol, aluminum trichloride, and the like may be added. According to circumstances, in order to endow incombustibility, halogen containing solvents such as carbon tetrachloride, trifluoroethylene, and the like may be further included, and in order to improve high temperature preservability, carbon dioxide gas may be further included, and FEC (fluoro-ethylene carbonate), PRS (propene sultone), FPC (fluoro-propylene carbonate), and the like may be further included.

The lithium secondary battery according to the invention may not only be used in a battery cell used as power supply of a small device, but also be used as a unit battery in a medium-large sized battery module comprising plural battery cells.

Hereinafter, preferable examples will be presented for better understanding of the invention. However, these examples are presented only as the illustrations of the invention, and the invention is not limited thereby.

EXAMPLE 1

(1) Preparation of a Binder for an Anode

A monomer mixture comprising (a) 1,3-butadiene (47.5 parts by weight), (b) styrene (47.5 parts by weight), (c) acrylic acid (2 parts by weight), and (d1) polyethylene glycol monoacrylate (3 parts by weight); sodium lauryl sulfate emulsifier (0.3 parts by weight); and potassium persulfate polymerization initiator (0.1 parts by weight); was added to water solvent (150 parts by weight).

The temperature of the mixture was raised to 75° C., and then, it was subjected to a polymerization reaction for about 5 hours while maintaining 75° C., thus obtaining a binder comprising a copolymer in the form of latex particles and water.

After polymerization, the pH of the binder was adjusted to a range of pH 7 to 8 using sodium hydroxide, and the binder of Example 1 was obtained.

The obtained binder of Example 1 had a total solid content of 40%, and the average particle diameter of latex particles measured using particle size analyzer (NICOMP AW380, manufactured by PSS Inc.) was 155 nm.

(2) Preparation of an Anode Mixture

Artificial graphite (95 parts by weight) was used as anode active material, acetylene black (1.5 parts by weight) as conductive agent, the binder of Example 1 (2.0 parts by weight) as a binder, and carboxy methyl cellulose (1.5 parts by weight) as a thickener, and they were stirred in a dispersion medium, water, for 1 hour and mixed. Wherein, the slurry phase was controlled such that the total solid content became 45 wt %, thus obtaining the anode mixture of Example 1.

(3) Preparation of an Anode

A copper foil with a thickness of 10 μm was prepared and used as an anode current collector. Using a comma coater, the anode mixture of Example 1 was coated on both sides of the anode current collector in the loading amount of 8.0 mg/cm² per one side, hot air dried in an oven of 80° C. for 10 minutes, and then, roll-pressed such that the total thickness became 190 μm. Thereby, the anode of Example 1 was obtained.

(4) Preparation of a Secondary Battery 90 parts by weight of $Li_{1.03}Ni_{0.6}Co_{0.6}Mn_{0.2}O_2$ was used as cathode active material, 5.0 parts by weight of acetylene black as a conductive agent, and 50 parts by weight (10% solid content) of polyvinylidene fluoride (PVdF) as a binder, and they were stirred in NMP solvent for 1 hour and mixed. Wherein, the slurry phase was controlled such that the total solid content became 70 wt %, thus obtaining the cathode mixture of Example 1.

An aluminum foil with a thickness of 20 μm was prepared and used as a cathode current collector. Using a comma coater, the cathode mixture of Example 1 was coated on both sides of the cathode current collector in the loading amount of 15.6 mg/cm² per one side, hot air dried in an oven of 80° C. for 10 minutes, and then, roll-pressed such that the total thickness became 190 μm. Thereby, the cathode of Example 1 was obtained.

A separator was inserted between the anode and cathode of Example 1 and assembled, and then, electrolyte was injected, and a lithium ion battery was completed according to a method commonly known in the art.

As the electrolyte, $LiPF_6$ was dissolved in a mixed solvent (weight ratio of EC:PC:DEC=3:2:5) of ethylene carbonate (EC), propylene carbonate (PC) and diethyl carbonate (DEC) such that the concentration became 1.3 M, and fluoroethylene carbonate (FEC) was added such that it constituted 10 wt % of the total weight of the electrolyte.

Examples 2 to 7 and Comparative Example 1 to 9

(1) Preparation of a Binder for an Anode

The binders of Examples 2 to 7 and Comparative Examples 1 o 9 were respectively prepared by polymerization by the same method as Example 1, except that the monomer compositions were changed according to the following Table 1.

The binders of Examples 2 to 7 and Comparative Example 1 to 9 commonly comprise a copolymer in the form of latex particles, and had a total solid content of 40%.

(2) Preparation of an Anode Mixture, an Anode, and a Secondary Battery

The anode mixtures, anodes, and lithium secondary batteries of Examples 2 to 7 and Comparative Examples 1 to 9 were respectively prepared by the same method as Example 1, except that the binders of Examples 2 to 7 and Comparative Examples 1 to 9 were respectively used instead of the binder of Example 1.

In the following Table 1, the first monomers indicate (a) 1,3-butadiene (BD), the second monomers indicate (b) styrene (SM), the third monomers indicate (c) acrylic acid (AA), the fourth monomers indicate (d1) polyethylene glycol monoacrylate (PEGA) or (d2) polyethylene glycol monomethacrylate (PEGMA).

And, the monomer content is based on the content (wt %) in the total weight (100 wt %) of the monomers, and the content ratio of monomers is based on weight ratio. In case there is a number of 3 or more decimal places, it was rounded to two decimal places.

TABLE 1

| | Monomer content (wt %) | | | | Monomer content ratio | | | |
|---|---|---|---|---|---|---|---|---|
| | M1 | M2 | M3 | M4 | M1/M4 | M2/M4 | M3/M4 | M1/M2 |
| Example 1 | 47.5 | 47.5 | 2 | 3 | 15.83 | 15.83 | 0.67 | 1 |
| Example 2 | 47.5 | 47.5 | 2 | 3 | 15.83 | 15.83 | 0.67 | 1 |
| Example 3 | 47.5 | 47.5 | 2 | 3 | 15.83 | 15.83 | 0.67 | 1 |
| Example 4 | 48.5 | 48.5 | 2 | 1 | 48.5 | 48.5 | 2 | 1 |
| Example 5 | 44 | 44 | 2 | 10 | 4.4 | 4.4 | 0.2 | 1 |
| Example 6 | 48.5 | 48.5 | 2 | 1 | 48.5 | 48.5 | 2 | 1 |
| Example 7 | 44 | 44 | 2 | 10 | 4.4 | 4.4 | 0.2 | 1 |
| Comparative Example 1 | 49 | 49 | 2 | 0 | — | — | — | 1 |

TABLE 1-continued

| | Monomer content (wt %) | | | | Monomer content ratio | | | |
|---|---|---|---|---|---|---|---|---|
| | M1 | M2 | M3 | M4 | M1/M4 | M2/M4 | M3/M4 | M1/M2 |
| Comparative Example 2 | 48.6 | 48.6 | 2 | 0.8 | 60.75 | 60.75 | 2.5 | 1 |
| Comparative Example 3 | 43 | 43 | 2 | 12 | 3.58 | 3.58 | 0.17 | 1 |
| Comparative Example 4 | 48.6 | 48.6 | 2 | 0.8 | 60.75 | 60.75 | 2.5 | 1 |
| Comparative Example 5 | 43 | 43 | 2 | 12 | 3.58 | 3.58 | 0.17 | 1 |
| Comparative Example 6 | 39 | 56 | 2 | 3 | 13 | 18.67 | 0.67 | 0.70 |
| Comparative Example 7 | 56 | 39 | 2 | 3 | 18.67 | 13 | 0.67 | 1.44 |
| Comparative Example 8 | 48.5 | 48.5 | 0 | 3 | 16.17 | 16.17 | 0 | 1 |
| Comparative Example 9 | 46.5 | 46.5 | 4 | 3 | 15.5 | 15.5 | 1.33 | 1 |

*M1: first monomers
*M2: second monomers
*M3: third monomers
*M4: fourth monomers In the Table 1, the monomer mixtures of Examples 1 to 7 respectively meet the kinds and contents of monomers limited in one embodiment.

Specifically, the monomer mixture comprising, based on the total weight (100 wt %) of the monomer mixture, a) 40 to 55 wt % of aliphatic conjugated diene-based first monomers, b) 40 to 55 wt % of aromatic vinyl-based second monomers, c) 0.1 to 3 wt % of unsaturated carboxylic acid-based third monomers, and d) 1 to 11 wt % of polyethylene glycol mono(meth)acrylate was subjected to emulsion polymerization to prepare binder.

On the other hand, Comparative Example 1 does not comprise fourth monomers, and Comparative Examples 2 to 5 comprise fourth monomers but the content range is under (Comparative Examples 2 and 4) or exceeds (Comparative Examples 3 and 5) the content range limited in one embodiment. Comparative Example 6 and 7 comprise fourth monomers, but the content ranges of first and second monomers do not fall within preferable ranges. Comparative Example 8 and 9 comprise fourth monomers, but do not comprise third monomers or the content range does not fall within preferable range.

Furthermore, in each monomer mixture of Examples 1 to 7, the weight ratio of the first monomers/fourth monomers (i.e., weight ratio of first repeat units/fourth repeat units) is within a range of 3.64 to 55, the weight ratio of the second monomers/fourth monomer (i.e., weight ratio of second repeat units/fourth repeat units) is within a range of 3.64 to 55, the weight ratio of the third monomers/fourth monomers (i.e., weight ratio of third repeat units/fourth repeat units) is within a range of 0.01 to 3, and the weight ratio of the first monomers/second monomers (i.e., weight ratio of first repeat units/second repeat units) is within a range of 0.73 to 1.38.

On the other hand, in each monomer mixture of Comparative Examples 1 to 5, the weight ratio of the third monomers/fourth monomers is within a range of 0.01 to 3, and the weight ratio of the first monomers/second monomers is within a range of 0.73 to 1.38, but the weight ratio of the first monomers/fourth monomers and the weight ratio of the second monomers/fourth monomers do not meet the above explained ranges. In each monomer mixture of Comparative Examples 6 and 7, the weight ratio of the first monomers/second monomers does not fall within a preferable range. In the monomer mixture of Comparative Example 8, the weight ratio of the third monomers/fourth monomers does not fall within a preferable range.

Comparative Example 10

(1) Preparation of a Binder for an Anode

The binder of Comparative Example 10 was prepared by polymerization by the same method as Example 1, except that a monomer mixture comprising methyl methacrylate (45 parts by weight), polyethylene glycol monoacrylate (45 parts by weight), acrylic acid (1.3 parts by weight), methacrylic acid (3.7 parts by weight), and trimethylol propane triacrylate (5 parts by weight), and water solvent (500 parts by weight) were used.

The binder of Comparative Example 10 comprises a copolymer in the form of latex particles, and has a total solid content of 17%.

(2) Preparation of an Anode Mixture, an Anode, and a Secondary Battery

The anode mixture, anode, and lithium secondary battery of Comparative Example 10 were prepared by the same method as Example 1, except that the binder of Comparative Example 10 was used instead of the binder of Example 1.

Comparative Example 11

(1) Preparation of a Binder for an Anode

The binder of Comparative Example 11 was prepared by polymerization by the same method as Example 1, except that a monomer mixture comprising polyethylene glycol monoacrylate (86.4 parts by weight), and trimethylol propane triacrylate (13.6 parts by weight), and water solvent (500 parts by weight) were used.

The binder of Comparative Example 11 comprises a copolymer in the form of latex particles, and has a total solid content of 17%.

(2) Preparation of an Anode Mixture, an Anode, and a Secondary Battery

The anode mixture, anode, and lithium secondary battery of Comparative Example 11 were prepared by the same method as Example 1, except that the binder of Comparative Example 11 was used instead of the binder of Example 1.

Comparative Example 12

(1) Preparation of a Binder for an Anode

The binder of Comparative Example 12 was prepared by polymerization by the same method as Example 1, except that a monomer mixture comprising polyethylene glycol monoacrylate (30 parts by weight), vinyl acetate (15 parts by weight), acrylic acid (1.3 parts by weight), methacrylic acid (3.7 parts by weight), methyl methacrylate (45 parts by weight), and trimethylol propane triacrylate (5 parts by weight), and water solvent (500 parts by weight) were used.

The binder of Comparative Example 12 comprises a copolymer in the form of latex particles, and has a total solid content of 17%.

(2) Preparation of an Anode Mixture, an Anode, and a Secondary Battery

The anode mixture, anode, and lithium secondary battery of Comparative Example 12 were prepared by the same method as Example 1, except that the binder of Comparative Example 12 was used instead of the binder of Example 1.

Comparative Example 13

(1) Preparation of a Binder for an Anode

The binder of Comparative Example 13 was prepared by polymerization by the same method as Example 1, except that a monomer mixture comprising polyethylene glycol monoacrylate (30 parts by weight), vinyl acetate (55 parts by weight), acrylic acid (2 parts by weight), and trimethylol propane triacrylate (13 parts by weight), and water solvent (500 parts by weight) were used.

The binder of Comparative Example 13 comprises a copolymer in the form of latex particles, and has a total solid content of 17%.

(2) Preparation of an Anode Mixture, an Anode, and a Secondary Battery

The anode mixture, anode, and lithium secondary battery of Comparative Example 13 were prepared by the same method as Example 1, except that the binder of Comparative Example 13 was used instead of the binder of Example 1.

Comparative Example 14

(1) Preparation of a Binder for an Anode

The binder of Comparative Example 14 was prepared by polymerization by the same method as Example 1, except that a monomer mixture comprising polyethylene glycol dimethacrylate (5 parts by weight), cyclohexyl methacrylate (30 parts by weight), methacrylic acid (1 part by weight), acrylic acid (1 part by weight), acrylamide (0.1 parts by weight), 2-hydroxyethyl methacrylate (5 parts by weight), 2-ethylhexylacrylate (55 parts by weight), methyl methacrylate (1 part by weight), butyl methacrylate (0.4 parts by weight), butyl acrylate (1 part by weight), and trimethylol propane triacrylate (0.5 parts by weight) was used.

The binder of Comparative Example 14 comprises a copolymer in the form of latex particles, and has a total solid content of 40%.

(2) Preparation of an Anode Mixture, an Anode, and a Secondary Battery

The anode mixture, anode, and lithium secondary battery of Comparative Example 14 were prepared by the same method as Example 1, except that the binder of Comparative Example 14 was used instead of the binder of Example 1.

Experimental Example 1: Evaluation of a Binder for an Anode

Each binder of Examples 1 to 7 and Comparative Examples 1 to 14 was evaluated under the following conditions, and the results were shown in the following Table 2.

(1) Average particle diameter of latex particles: The arithmetic mean particle diameter of latex particles in the binder, specifically intensity distribution mean particle diameter was obtained using a particle size analyzer (NICOMP AW380, manufactured by PSS Inc.).

(2) Gel content in the binder: calculated using Mathematical Formula 1. Specifically, a designated binder was dried at 80° C. for 24 hours, and then, about 0.5 g was taken and the accurate weight was measured, which was put into $M_a$ of Mathematical Formula 1.

And then, the binder of which weight had been measured was dipped in 50 g of tetrahydrofuran (THF) for 24 hours. And then, the binder contained in THF was filtered through 200 Mesh of which weight was known, and then, the Mesh and the copolymer remaining on the mesh were dried together at 80° C. for 24 hours, and then, the weight of the mesh and copolymer remaining on the mesh was measured, and a value calculated by subtracting the weight of 200 Mesh therefrom was used as the weight of copolymer, Mb.

$$\text{Gel content(\%)}=M_b/M_a*100 \qquad \text{[Mathematical Formula 1]}$$

Per each binder, the average value of 3 or more samples was calculated, and the results were shown in the following Table 2.

(3) Stability of a binder: Using a homogenizer, 100 g of a binder was put in a container and fixed such that the head was immersed in latex, and then, shear was applied at 300 rpm for 10 minutes, followed by filtering through 200 mesh, thus measuring coagulum.

TABLE 2

| | Average particle diameter of polymer (latex particles) (μm) | Gel content in binder (%) | Binder stability test (coagulum, ppm) |
|---|---|---|---|
| Example 1 | 155 | 98.9 | 150 |
| Example 2 | 151 | 98.8 | 210 |
| Example 3 | 150 | 98.7 | 170 |
| Example 4 | 152 | 98.7 | 180 |
| Example 5 | 153 | 98.2 | 220 |
| Example 6 | 150 | 98.8 | 190 |
| Example 7 | 155 | 98.1 | 220 |
| Comparative Example 1 | 153 | 98.5 | 180 |
| Comparative Example 2 | 155 | 98.7 | 180 |
| Comparative Example 3 | 160 | 97.8 | 230 |
| Comparative Example 4 | 153 | 98.8 | 190 |
| Comparative Example 5 | 161 | 97.7 | 250 |
| Comparative Example 6 | 153 | 98.8 | 170 |
| Comparative Example 7 | 155 | 98.7 | 210 |
| Comparative Example 8 | 237 | 99.1 | 7,980 |
| Comparative Example 9 | 150 | 99.0 | 190 |
| Comparative Example 10 | 109 | 93.7 | 350 |

TABLE 2-continued

| | Average particle diameter of polymer (latex particles) (μm) | Gel content in binder (%) | Binder stability test (coagulum, ppm) |
|---|---|---|---|
| Comparative Example 11 | 121 | 99.2 | 1,250 |
| Comparative Example 12 | 102 | 95.2 | 550 |
| Comparative Example 13 | 210 | 98.2 | 980 |
| Comparative Example 14 | 165 | 90.3 | 390 |

From the Table 2, it can be confirmed that the binders of Examples 1 to 7 respectively comprise a copolymer (latex particles) having an average particle diameter of 50 to 500 nm, and exhibit a gel content of 95% or more, and coagulum of 250 ppm or less in the stability test.

On the other hand, it is confirmed that the binders of Comparative Examples 10 to 14 exhibit inferior gel content or stability, because polyethylene glycol mono(meth)acrylate-based fourth monomers were used but aliphatic conjugated diene-based first monomers and aromatic vinyl-based second monomers were not used and replaced with other monomers.

Meanwhile, in the case of the binders of Comparative Examples 1 to 5, although polyethylene glycol mono(meth)acrylate-based fourth monomers were not used or the amount used did not fall within the range limited in one embodiment, a gel content and stability equivalent to those of Examples 1 to 7 were secured because aliphatic conjugated diene-based first monomers and aromatic vinyl-based second monomers were used. In the case of the binders of Comparative Examples 6 and 7, although the content ranges of aliphatic conjugated diene-based first monomers and aromatic vinyl-based second monomers did not meet the limited ranges, a gel content and stability equivalent to those of Examples 1 to 7 were secured because the first and second monomers were used. In the case of the binder of Comparative Example 8, stability was deteriorated because the third monomers were not used. In the case of the binder of Comparative Example 9, although the content range of the third monomers do not meet the limited range, a gel content and stability equivalent to those of Examples 1 to 7 were secured because aliphatic conjugated diene-based first monomers and aromatic vinyl-based second monomers were used.

However, with regard to the binders of Comparative Examples 1 to 9, it is necessary to confirm the effects when applied in a battery.

Experimental Example 2: Evaluation of an Anode and a Secondary Battery

The anodes and lithium secondary batteries of Examples 1 to 7 and Comparative Examples 1 to 14 were evaluated under the following conditions, and the results were reported in the following Table 3.

(1) Anode adhesion: For each anode of Examples and Comparative examples, peel strength was measured 5 times or more, and the average value was calculated and shown in the following Table 3. Wherein, peel strength is a measurement of a force (N) required to peel off a tape from an anode at the peel angle of 180°, after attaching the anode to an adhesive tape having a width of 10 mm, using a tension meter (Stable Micro System, TA-XT)

(2) Initial discharge resistance of a secondary battery: In a 25° C. constant temperature chamber, voltage drop generated when progressing discharge at 150 A for 10 seconds, from the state when the lithium ion battery is 50% SOC (state of charge) was reported, and DC-resistance value was calculated using R=V/I (Ohm's law).

(3) Capacity retention rate of a secondary battery after 100 cycles: In a 25° C. constant temperature chamber, charge of the lithium secondary battery at CC/CV mode at 36 A to 4.15 V, followed by discharge at CC mode to 3.0 V was set as one cycle, with 20 minutes pause between the charge and discharge, and total 100 cycles were progressed. The rate of discharge capacity measured at $100^{th}$ cycle to the discharge capacity measured at the first cycle was calculated.

TABLE 3

| | Anode adhesion (gf/cm) | Initial discharge resistance of secondary battery (mΩ) | Capacity retention rate of secondary battery after 100 cycles (%) |
|---|---|---|---|
| Example 1 | 29.1 | 1.15 | 92.5 |
| Example 2 | 28.9 | 1.14 | 92.7 |
| Example 3 | 29.3 | 1.15 | 92.5 |
| Example 4 | 27.2 | 1.25 | 92.1 |
| Example 5 | 25.8 | 1.05 | 91.5 |
| Example 6 | 27.1 | 1.25 | 92.0 |
| Example 7 | 25.7 | 1.07 | 91.4 |
| Comparative Example 1 | 21.1 | 1.29 | 88.3 |
| Comparative Example 2 | 25.5 | 1.27 | 89.1 |
| Comparative Example 3 | 22.7 | 1.05 | 88.5 |
| Comparative Example 4 | 25.7 | 1.25 | 89.0 |
| Comparative Example 5 | 22.5 | 1.07 | 88.7 |
| Comparative Example 6 | 18.2 | 1.15 | 89.3 |
| Comparative Example 7 | 23.7 | 1.20 | 89.0 |
| Comparative Example 8 | 19.1 | 1.18 | 87.5 |
| Comparative Example 9 | 21.1 | 1.15 | 88.9 |
| Comparative Example 10 | 19.2 | 1.11 | 89.5 |
| Comparative Example 11 | 15.8 | 1.10 | 81.5 |
| Comparative Example 12 | 17.3 | 1.15 | 85.7 |
| Comparative Example 13 | 14.1 | 1.19 | 85.5 |
| Comparative Example 14 | 22.3 | 1.23 | 87.5 |

From the Table 3, it can be confirmed that Examples 1 to 7 exhibit excellent anode adhesion, initial discharge resistance of a secondary battery, and life.

It means that as the result of emulsion polymerization of a monomer mixture meeting the kinds and contents of monomers (derived repeat units) limited in one embodiment, anode adhesion of a binder comprising the polymer is excellent, resistance of a secondary battery is minimized, and ultimately, life of a secondary battery is improved.

However, in case a binder that does not comprise the fourth monomers was used (Comparative Example 1), anode adhesion was just 21.1 gf/cm, initial discharge resistance of a secondary battery was as high as 1.29 mΩ, and above all, capacity retention rate of a secondary battery after 100 cycles was just 88.3%.

In case the fourth monomers were included but the content range was under the range limited in one embodiment (Comparative Examples 2 and 4), due to the existence of the polyethylene glycol mono(meth)acrylate-based fourth monomers, anode adhesion increased compared to Comparative Example 1, and initial discharge resistance of a secondary battery decreased to a level of 1.25~1.27 mΩ, but capacity retention rate of a secondary battery after 100 cycles was just 89.0~89.1%.

In the Comparative Examples 2 and 4, the weight ratios of the aliphatic conjugated diene-based first monomers and aromatic vinyl-based second monomers to polyethylene glycol mono(meth)acrylate-based fourth monomers (i.e., the weight ratio of the first monomers/fourth monomers, and the weight ratio of the second monomers/fourth monomers) also exceed the above explained ranges, respectively.

To the contrary, in case the fourth monomers were included but the content range exceeded the range limited in one embodiment (Comparative Examples 3 and 5), due to the existence of the polyethylene glycol mono(meth)acrylate-based fourth monomers, anode adhesion increased and initial discharge resistance of a secondary battery partially decreased compared to Comparative Example 1. However, since the contents of the first and second monomers relatively decreased, anode adhesion decreased and initial discharge resistance of a secondary battery partially increased compared to Comparative Examples 2 and 4. Above all, capacity retention rate of a secondary battery after 100 cycles was just 88.5~88.7%.

In the Comparative Examples 3 and 5, the weight ratios of the aliphatic conjugated diene-based first monomers and aromatic vinyl-based second monomers to polyethylene glycol mono(meth)acrylate-based fourth monomers (i.e., the weight ratio of the first monomers/fourth monomers, and the weight ratio of the second monomers/fourth monomers) are also under the above explained ranges, respectively.

In case the fourth monomers were included but the content ranges of the aliphatic conjugated diene-based first monomers and aromatic vinyl-based second monomers did not fall within the limited ranges (Comparative Examples 6 and 7), anode adhesion was low or resistance increased, and capacity retention rate of a secondary battery after 100 cycles was just 89.0~89.3%.

In case the fourth monomers were included but the content range of the unsaturated carboxylic acid-based third monomers did not fall within the limited range (Comparative Examples 8 and 9), anode adhesion was low and capacity retention rate of a secondary battery after 100 cycles. Was just 87.5~88.9%.

And, in case the polyethylene glycol mono(meth)acrylate-based fourth monomers were included, but the aliphatic conjugated diene-based first monomers and the aromatic vinyl-based second monomers were not included and replaced with other monomers (Comparative Examples 10 to 14), adhesion and life were inferior to Examples 1 to 7.

Meanwhile, in Examples 1 to 7, it is confirmed that by adjusting the content of each monomer and the content ratio of two kinds of monomers, anode adhesion, initial discharge resistance and life of a secondary battery may be controlled.

It means that by adjusting the content of each monomer and the content ratio of two kinds of monomers referring to Examples 1 to 7 in conjunction with the explanations of one embodiment, anode adhesion, and initial resistance and life of a secondary battery can be controlled to aimed ranges.

The invention claimed is:

1. A binder for an anode of a secondary battery, comprising: a copolymer comprising, based on a total weight (100 wt %) of repeat units,
a) 41 to 54 wt % of first repeat units derived from aliphatic conjugated diene-based first monomers,
b) 41 to 54 wt % of second repeat units derived from aromatic vinyl-based second monomers,
c) 1.5 to 2.3 wt % of third repeat units derived from unsaturated carboxylic acid-based third monomers, and
d) 1 to 10 wt % of fourth repeat units derived from polyethylene glycol mono(meth)acrylate,
wherein a weight ratio of the first repeat units to the fourth repeat units (first repeat units/fourth repeat units) is 4.4 to 48.5, and
wherein a weight ratio of the second repeat units to the fourth repeat units (second repeat units/fourth repeat units) is 4.4 to 48.5.

2. The binder for an anode of a secondary battery according to claim 1, wherein a weight ratio of the third repeat units to the fourth repeat units (third repeat units/fourth repeat units) is 0.01 to 3.

3. The binder for an anode of a secondary battery according to claim 1, wherein a weight ratio of the first repeat units to the second repeat units (first repeat units/second repeat units) is 0.73 to 1.38.

4. The binder for an anode of a secondary battery according to claim 1, wherein the aliphatic conjugated diene-based first monomers are one or more selected from the group consisting of 1,3-butadiene, 2-methyl-1,3-butadiene, 2,3-dimethyl-1,3-butadiene, 1,2-dimethyl-1,3-butadiene, 1,4-dimethyl-1,3-butadiene, 1-ethyl-1,3-butadiene, 2-phenyl-1,3-butadiene, 1,3-pentadiene, 1,4-pentadiene, 3-methyl-1,3-pentadiene, 4-methyl-1,3-pentadiene, 2,4-dimethyl-1,3-pentadiene, 3-ethyl-1,3-pentadiene, 1,3-hexadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene and 7-methyl-1,6-octadiene.

5. The binder for an anode of a secondary battery according to claim 1, wherein the aromatic vinyl-based second monomers are one or more selected from the group consisting of styrene, α-methylstyrene, β-methylstyrene, p-t-butylstyrene, chlorostyrene, vinyl benzoate, methyl vinyl benzoate, vinyl naphthalene, chloromethylstyrene, hydroxymethylstyrene and divinyl benzene.

6. The binder for an anode of a secondary battery according to claim 1, wherein the unsaturated carboxylic acid-based third monomers are one or more selected from the group consisting of acrylic acid, methacrylic acid, maleic acid, fumaric acid, glutaric acid, itaconic acid, tetrahydrophthalic acid, crotonic acid, isocrotonic acid, and nadic acid.

7. The binder for an anode of a secondary battery according to claim 1, wherein the copolymer is latex particles having an average particle diameter of 50 nm to 500 nm.

8. The binder for an anode of a secondary battery according to claim 1, further comprising an aqueous solvent.

9. The binder for an anode of a secondary battery according to claim 8, wherein the aqueous solvent is included in a content of 50 to 1,000 parts by weight, based on 100 parts by weight of the copolymer.

10. A method for preparing the binder for an anode of a secondary battery according to claim 1, comprising a step of conducting emulsion polymerization of a monomer mixture in the presence of an emulsifier and a polymerization initiator to prepare the copolymer,
wherein based on a total weight (100 wt %) of the monomer mixture, a) 41 to 54 wt % of the aliphatic conjugated diene-based first monomers, b) 41 to 54 wt % of the aromatic vinyl-based second monomers, c) 1.5 to 2.3 wt % of the unsaturated carboxylic acid-based third monomers, and d) 1 to 10 wt % of the polyethylene glycol mono(meth)acrylate are included.

11. An anode mixture for a secondary battery, comprising the binder for an anode of a secondary battery according to claim 1, and anode active material.

12. The anode mixture for a secondary battery according to claim 11, further comprising a conductive material.

13. An anode of a secondary battery, comprising: an anode mixture layer comprising the anode mixture for a secondary battery according to claim 11, and an anode current collector.

14. A secondary battery comprising the anode of a secondary battery according to claim 13.

\* \* \* \* \*